(12) United States Patent
Guvelioglu et al.

(10) Patent No.: US 7,988,948 B2
(45) Date of Patent: Aug. 2, 2011

(54) STEAM-HYDROCARBON REFORMING METHOD WITH LIMITED STEAM EXPORT

(75) Inventors: Galip Hakan Guvelioglu, Macungie, PA (US); Eugene S. Genkin, Allentown, PA (US); Kerry Andrew Scott, Allentown, PA (US); David Anthony Zagnoli, Macungie, PA (US)

(73) Assignee: Air Products and Chemicals, Inc., Allentown, PA (US)

( * ) Notice: Subject to any disclaimer, the term of this patent is extended or adjusted under 35 U.S.C. 154(b) by 610 days.

(21) Appl. No.: 12/122,160

(22) Filed: May 16, 2008

(65) Prior Publication Data

US 2009/0230359 A1     Sep. 17, 2009

Related U.S. Application Data

(60) Provisional application No. 61/037,195, filed on Mar. 17, 2008.

(51) Int. Cl.
*C01B 3/26* (2006.01)
(52) U.S. Cl. ........................................ 423/652; 252/373
(58) Field of Classification Search ................... 252/373; 423/650, 648.1, 652–654
See application file for complete search history.

(56) References Cited

U.S. PATENT DOCUMENTS

| | | | |
|---|---|---|---|
| 3,622,267 A | 11/1971 | Heidelberg et al. | |
| 4,553,981 A * | 11/1985 | Fuderer | 48/62 R |
| 4,869,894 A | 9/1989 | Wang et al. | |
| 5,264,202 A | 11/1993 | Snyder | |
| 5,669,960 A | 9/1997 | Couche | |
| 5,980,857 A * | 11/1999 | Kapoor et al. | 423/648.1 |
| 6,818,028 B2 | 11/2004 | Barnett et al. | |
| 6,981,994 B2 | 1/2006 | Drnevich et al. | |
| 7,148,261 B2 | 12/2006 | Hershkowitz et al. | |
| 7,220,505 B2 | 5/2007 | Malhotra et al. | |
| 7,297,160 B2 | 11/2007 | Salamone et al. | |
| 2002/0115731 A1 * | 8/2002 | Price | 518/703 |
| 2003/0110693 A1 * | 6/2003 | Drnevich et al. | 48/197 R |
| 2003/0110694 A1 | 6/2003 | Drnevich et al. | |
| 2005/0066813 A1 | 3/2005 | Dunn | |
| 2006/0242902 A1 | 11/2006 | Tautz | |

(Continued)

FOREIGN PATENT DOCUMENTS

EP      0483795 A1     5/1992

(Continued)

OTHER PUBLICATIONS

Fritsch, Swen, Steam Reformer Based Hydrogen Plant Optimisation, Prepared for Presentation at The Internation Conference HYFORUM 2000, Munich Germany, Sep. 11-15, 2000.*

*Primary Examiner* — Stanley Silverman
*Assistant Examiner* — Justin Bova
(74) *Attorney, Agent, or Firm* — Bryan C. Hoke, Jr.

(57) ABSTRACT

A method for generating hydrogen and/or syngas in a production facility where little or no export steam is produced. Most or all of the steam produced from the waste heat from the process is used in the steam-hydrocarbon reformer. Reformed gas is passed to a pressure swing adsorption system for $H_2$ purification. In the method, $CO_2$ is removed from the pressure swing adsorber residual gas prior to recycling the residual gas to the reformer for use as feed and as fuel. Plant efficiencies using the method and prior art-type methods are compared.

20 Claims, 6 Drawing Sheets

U.S. PATENT DOCUMENTS

| | | |
|---|---|---|
| 2006/0277828 A1 | 12/2006 | Licht |
| 2007/0051042 A1 | 3/2007 | Grover et al. |
| 2007/0104641 A1 | 5/2007 | Ahmed et al. |
| 2007/0130831 A1 | 6/2007 | Vipperla et al. |
| 2007/0140954 A1 | 6/2007 | Tio |
| 2009/0165377 A1 | 7/2009 | Koh et al. |
| 2009/0230359 A1 | 9/2009 | Guvelioglu et al. |
| 2009/0298957 A1 | 12/2009 | Gauthier et al. |

FOREIGN PATENT DOCUMENTS

| | | |
|---|---|---|
| EP | 1364911 A1 | 11/2003 |
| EP | 1277697 B1 | 12/2006 |
| FR | 2890954 | 3/2007 |
| WO | 2006054008 A1 | 5/2006 |
| WO | 2006097703 A1 | 9/2006 |
| WO | 2007020514 A2 | 2/2007 |
| WO | 2007056004 A1 | 5/2007 |

* cited by examiner

STEAM-HYDROCARBON REFORMING METHOD WITH LIMITED STEAM EXPORT

CROSS-REFERENCE TO RELATED APPLICATIONS

This patent application claims priority to provisional application U.S. Ser. No. 61/037,195 filed on Mar. 17, 2008, the contents of which are hereby incorporated by reference.

BACKGROUND

The present invention relates to a method for generating hydrogen and/or synthesis gas by steam-hydrocarbon reforming along with generating steam using waste heat from the steam-hydrocarbon reforming process. More particularly, the present invention relates to such a process with little or no steam export.

Synthesis gas is used to produce products such as ammonia, methanol and hydrogen. Synthesis gas is generated by high temperature processes where a lot of waste heat is available. The waste heat is generally used to generate steam and helps to improve the overall efficiency of the synthesis gas facility. In typical facilities, the amount of steam generated from the waste heat significantly exceeds the amount of steam needed for reforming of a hydrocarbon feed in a steam-hydrocarbon reformer. The excess steam is exported or used to generate power in a steam turbine.

However, exporting steam requires expensive pipeline systems including control and safety valves, steam traps, heat tracing, etc. Exporting steam is justified when steam is needed nearby and/or a customer is willing to pay a reasonable price for the steam. Exporting steam can also impose constraints on plant location in order to minimize the length of the steam export piping.

Facilities for producing synthesis gas generate large amounts of steam from the waste heat. Depending on the design, overall steam production may be 35% to 300% more than required for internal use in the steam-hydrocarbon reformer. Current industry practice is to export the excess steam or to use the steam in a steam turbine for power production. Both options require additional capital expenditure and can be cost prohibitive for projects where there is no customer willing to buy the steam at a reasonable cost, or power can not be produced competitively.

For small hydrogen production units where steam export is not justified, a portion of the excess steam is often used in the process less efficiently or vented. The hydrogen plant may be designed with less heat recovery equipment resulting in a less efficient plant.

There are a number of design options that have been used to vary the total steam production from the synthesis gas plant and reduce steam export. These design options take into account process limitations such as supplemental fuel requirements for the catalytic steam reformer.

One widely used option is to preheat the combustion air for use in the reformer to high temperature, for example up to 600° C. (1100° F.). Combustion air is typically preheated in the convection section of the reformer and can be arranged using one or two stages depending on the desired preheat temperature. Preheating the combustion air helps to reduce the amount of fuel required for combustion in the reformer. Since less fuel is used, the flow of flue gases from the reformer is reduced resulting in less waste heat for generating steam.

Fuel preheating has a similar but smaller impact on overall steam production.

Another option is to use an adiabatic prereformer. An adiabatic prereformer is a vessel filled with Nickel-based reforming catalyst that is located upstream of the primary reformer. A mixed feed of steam and a hydrocarbon are fed to the adiabatic prereformer at a high temperature. The prereformed product is heated again by the combustion product gases and then fed to the primary reformer.

Use of a prereformer allows the recovery of additional heat from the flue gas back to the process by heating the prereformer effluent stream, thus reducing the amount of heat available for steam generation. Use of a prereformer has other benefits such as removing higher hydrocarbons from the feed stream to the primary reformer.

Facilities including a prereformer are typically cost effective since the size of the primary reformer may be reduced while maintaining high efficiency.

These methods to reduce the amount of steam are useful for cases where export steam has little or no value. However, the use of air preheat and/or a prereformer still has significant waste heat and can not provide suitable efficiencies without taking credit for steam export.

When credit for the steam produced can not be reasonably factored in to the efficiency of the synthesis gas generating facility, methods are required to lessen the impact on plant efficiency.

There is a need to lessen the impact on plant efficiency when little or no export steam is needed or produced. It would be desirable to produce hydrogen in a reforming process while producing little or no export steam and while maintaining overall plant efficiency.

BRIEF SUMMARY

The present invention relates to a method for generating hydrogen and/or synthesis gas in a production facility. The method comprises withdrawing a reformed gas mixture comprising $H_2$, $CO$, $CO_2$ and $H_2O$ from a plurality of catalyst-containing reformer tubes of a reformer; forming a $H_2$ product gas stream, a $CO_2$ by-product stream, and a residual gas stream from the reformed gas mixture, wherein the residual gas stream has a mass flow rate, $W_T$, and contains less than 10 mole % $CO_2$ and less than 65 mole % $H_2$; optionally introducing a first portion of the residual gas stream into a shift reactor, wherein the first portion of the residual gas stream has a mass flow rate, $W_1$; forming a reformer feed gas mixture stream from a feed steam stream, a second portion of the residual gas stream, and a reformer feedstock stream comprising a hydrocarbon, wherein the feed steam stream has a first steam mass flow rate, $R_1$, and wherein the second portion of the residual gas stream has a mass flow rate, $W_2$; introducing the reformer feed gas mixture stream into the plurality of catalyst-containing reformer tubes and reacting the hydrocarbon with the steam in a reforming reaction under reaction conditions effective to form the reformed gas mixture; introducing a fuel stream comprising combustible gases into a combustion section of the reformer, the fuel stream comprising a third portion of the residual gas stream and a supplemental fuel stream the third portion of the residual gas stream having a mass flow rate, $W_3$; introducing an oxidant stream containing oxygen into the combustion section of the reformer; combusting the combustible gases with the oxygen in the combustion section under conditions effective to combust the combustible gases to form a combustion product gas mixture and generate heat to supply energy for the reforming reaction; withdrawing the combustion product gas mixture from the combustion section of the reformer; and generating an intermediate gas stream comprising steam from a liquid water-containing stream via indirect heat exchange between the liquid water-containing stream and at least one of a stream formed from the reformed gas mixture and a stream formed from the combustion product gas mixture, the intermediate gas stream comprising steam having a pressure of 2 MPa to 12 MPa or 2 MPa to 5 MPa and having a second steam mass flow rate, $R_2$, wherein $$0.9 \leq \frac{R_2}{R_1} \leq 1.2 \text{ or } 0.9 \leq \frac{R_2}{R_1} \leq 1.1.$$

90% to 120% of the steam provided to the reformer for reforming is produced within the process.

The sum of the mass flow rate, $W_1$, of the first portion of the residual gas stream and the mass flow rate, $W_2$, of the second portion of the residual gas stream may be less than 35% of the total mass flow rate of the residual gas stream, $W_T$.

The mass flow rate, $W_1$, of the first portion of the residual gas stream introduced into the shift reactor may be zero to 10% of the total mass flow rate of the residual gas stream, $W_T$.

80% to 100% of the total mass flow rate of the residual gas stream, $W_T$, is recycled back into the process as the first portion of the residual gas, the second portion of the residual gas, and the third portion of the residual gas. Less than 20% of the residual gas may be diverted to other processes or flared (wasted).

The $CO_2$ by-product stream may contain 80 to 100 mole % $CO_2$ on a dry basis.

The fuel stream may have a hydrogen concentration of 0 to less than 50 mole % $H_2$. The fuel stream may have a hydrogen concentration of 20 to 48 mole % $H_2$. The fuel stream may have a CO concentration of 10 to 50 mole % CO.

The method may further comprise replenishing the feed steam stream from a stream formed from at least a portion of the intermediate gas stream comprising steam.

The method may further comprise superheating at least a portion of the intermediate gas stream via indirect heat exchange between the intermediate gas stream and at least a portion of the stream formed from the reformed gas mixture or another stream formed from the reformed gas mixture thereby forming a superheated intermediate gas stream; and replenishing the feed steam stream from a stream formed from at least a portion of the superheated intermediate gas stream. The superheated intermediate gas stream may be superheated by 40° C. to 175° C.

The method may further comprise superheating at least a portion of the intermediate gas stream via indirect heat exchange between the intermediate gas stream and at least a portion of the stream formed from the combustion product gas mixture or another stream formed from the combustion product gas mixture thereby forming a superheated intermediate gas stream; and replenishing the feed steam stream from at least a portion of the superheated intermediate gas stream. The superheated intermediate gas stream may be superheated by 40° C. to 175° C.

The method may further comprise introducing at least a portion of the stream formed from the reformed gas mixture with a temperature of 185° C. to 230° C. into a shift reactor containing copper oxide-based catalyst.

The method may further comprise superheating the intermediate gas stream via indirect heat exchange between the intermediate gas stream and at least a portion of the stream formed from the reformed gas mixture or another stream formed from the reformed gas mixture thereby forming a superheated intermediate gas stream; passing at least a portion of the superheated intermediate gas stream through a steam turbine to generate power and thereby forming a steam turbine effluent from the superheated intermediate gas stream; and replenishing the feed steam stream from at least a portion of the steam turbine effluent.

The step of forming the $CO_2$ by-product stream, the $H_2$ product gas stream, and the residual gas stream may comprise passing at least a portion of the reformed gas mixture to a $CO_2$ extractor to form the $CO_2$ by-product stream and a $CO_2$-depleted reformed gas mixture; and passing at least a portion of the $CO_2$-depleted reformed gas mixture to a pressure swing adsorber to form the $H_2$ product gas stream and the residual gas stream.

The step of forming the reformer feed gas mixture stream may comprise mixing the second portion of the residual gas stream and the reformer feedstock stream to form a hydrodesulphurization unit feed gas mixture stream; passing the hydrodesulphurization unit feed gas mixture stream to a hydrodesulphurization unit to form a sulfur-depleted reformer feedstock stream from an effluent of the hydrodesulphurization unit; mixing the feed steam stream and the sulfur-depleted reformer feedstock stream to form a prereformer feed gas mixture stream; and passing the prereformer feed gas mixture stream into a prereformer to form the reformer feed gas mixture stream from an effluent of the prereformer.

The step of forming the reformer feed gas mixture stream may comprise passing the reformer feedstock stream to a hydrodesulphurization unit to form a sulfur-depleted reformer feedstock stream from an effluent of the hydrodesulphurization unit; mixing the second portion of the residual gas stream, the feed steam stream and the sulfur-depleted reformer feedstock stream to form a prereformer feed gas mixture stream; and passing the prereformer feed gas mixture stream into a prereformer to form the reformer feed gas mixture stream from an effluent of the prereformer.

The step of forming the reformer feed gas mixture stream may comprise passing the reformer feedstock stream to a hydrodesulphurization unit to form a sulfur-depleted reformer feedstock stream from an effluent of the hydrodesulphurization unit; mixing the feed steam stream and the sulfur-depleted reformer feedstock stream to form a prereformer feed gas mixture stream; passing the prereformer feed gas mixture stream into a prereformer to form a prereformer effluent stream; and mixing the prereformer effluent stream and the second portion of the residual gas stream to form the reformer feed gas mixture stream.

DETAILED DESCRIPTION

The indefinite articles "a" and "an" as used herein mean one or more when applied to any feature in embodiments of the present invention described in the specification and claims. The use of "a" and "an" does not limit the meaning to a single feature unless such a limit is specifically stated. The definite article "the" preceding singular or plural nouns or noun phrases denotes a particular specified feature or particular specified features and may have a singular or plural connotation depending upon the context in which it is used. The adjective "any" means one, some, or all indiscriminately of whatever quantity.

For the purposes of simplicity and clarity, detailed descriptions of well-known devices, circuits, and methods are omitted so as not to obscure the description of the present invention with unnecessary detail.

The phrase "at least a portion" means "a portion or all."

Figure 1:
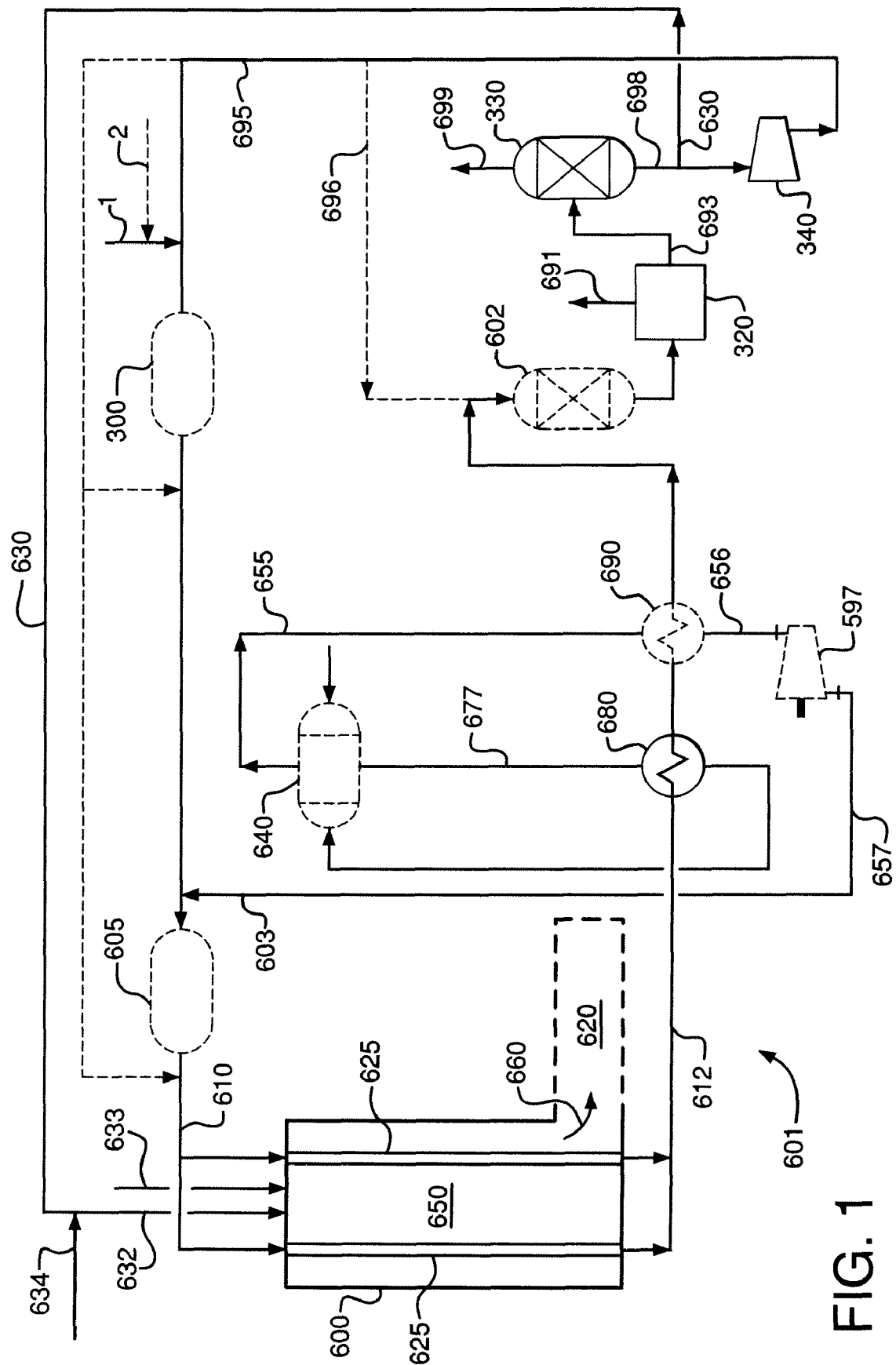
FIG. 1 is a process flow diagram of a production facility for generating hydrogen according to the present method.

The present invention relates to a method for generating hydrogen and/or synthesis gas in a production facility. The method will be described with reference to FIG. 1 showing a process flow diagram of a production facility 601. The method utilizes catalytic steam reforming. Catalytic steam reforming, also called steam methane reforming (SMR) or steam reforming, is defined as any process used to convert reformer feedstock to synthesis gas by reaction with steam over a catalyst. Synthesis gas, commonly called syngas, is any mixture comprising hydrogen and carbon monoxide. The reforming reaction is an endothermic reaction and may be described generally as $C_nH_m + n\ H_2O \rightarrow n\ CO + (m/2+n)H_2$. Hydrogen is generated when synthesis gas is generated.

A production facility for generating hydrogen and/or synthesis gas is a reformer and associated equipment for the production of hydrogen and/or synthesis gas. Associated equipment may include adiabatic prereformers, heat exchangers, pumps, fans, water-gas shift reactors, pressure swing adsorbers, condensers, boilers, steam drums, desulphurizers, deaerators, headers, manifolds, piping, etc.

Catalytic steam reforming takes place in a catalytic steam reformer 600. A catalytic steam reformer, also called a steam methane reformer, is defined herein as any fired furnace used to convert feedstock containing elemental hydrogen and carbon to synthesis gas by a reaction with steam over a catalyst with heat provided by combustion of a fuel. Feedstock may be natural gas, methane, naphtha, propane, refinery fuel gas, refinery off-gas, or other suitable reformer feedstock known in the art. Suitable operating temperatures range from 350° C. to 650° C. at the inlet and 750° C. to 950° C. at the outlet. Suitable pressures range from 1 to 50 atm. Preferred operating conditions for a catalytic steam reformer are known in the art.

The method comprises withdrawing a reformed gas mixture 612 from a plurality of catalyst-containing reformer tubes 625 of a reformer. A reformed gas mixture is any gas mixture that has been formed by the reforming reaction. The reformed gas mixture produced in the catalyst-containing reformer tubes generally comprises $H_2$, CO, $CO_2$, and $H_2O$. The reformed gas mixture may also comprise $CH_4$ from the feed that failed to react in the catalyst-containing reformer tubes. The concentration of $H_2$ in the reformed gas mixture is generally in the range of 40 mole % to 55 mole %. The concentration of CO is generally in the range of 7 mole % to 18 mole %.

The reformed gas mixture may be collected from the plurality of catalyst-containing tubes in a header. The reformed gas mixture typically exits the catalyst-containing reformer tubes at 750° C. (1382° F.) to 950° C. (1742° F.).

The method comprises forming a $H_2$ product gas stream 699, a $CO_2$ by-product stream 691, and a residual gas stream 698 from the reformed gas mixture 612. The residual gas stream 698 has a mass flow rate, $W_T$.

A $H_2$ product gas stream is defined as any stream formed from the reformed gas mixture having a $H_2$ concentration of 90 to 100 mole % $H_2$ on a dry basis.

A residual gas stream is defined as any stream formed from the reformed gas mixture comprising a $H_2$ concentration of 10 to 75 mole % $H_2$, a CO concentration of 10 to 80 mole % CO, a $CH_4$ concentration of 0 to 60 mole % and a $CO_2$ concentration of 0 to 40 mole % $CO_2$, all on a dry basis. The residual gas stream may contain 10 to 50 mole % $CH_4$ and 30 to 60 mole % $H_2$. The residual gas stream may contain less than 30 mole % $CO_2$. The residual gas may contain $N_2$, $H_2O$ and other gases. The residual gas is formed during at least the depressurization (blowdown) and purging stages of a PSA cycle. The residual gas stream composition may vary with time.

A $CO_2$ by-product stream is defined as any remaining stream excluding the $H_2$ product gas stream and the residual gas stream that is formed from the reformed gas mixture. The $CO_2$ by-product stream contains at least a portion of the $CO_2$ from the reformed gas mixture. The $CO_2$ by-product stream may contain greater than 50% on a molar basis of the $CO_2$ from the reformed gas mixture. The $CO_2$ by-product stream may contain 80 to 100 mole % $CO_2$ on a dry basis.

Forming may be a single step or may include a combination of various steps, for example, mixing, reacting, heating, cooling, compressing, expanding, throttling, separating, etc. A mixture is formed from a first gas and a second gas if the mixture comprises one or more elemental constituents from the first gas and one or more elemental constituents from the second gas. For example, a mixture comprising elemental carbon and/or elemental hydrogen from a methane-containing first gas and elemental hydrogen and/or elemental oxygen from a water-containing second gas is formed from the methane-containing first gas and the water-containing second gas. The mixture may comprise the element carbon and element hydrogen as methane from the methane-containing first gas and the element hydrogen and the element oxygen as water from the water-containing second gas. Or the methane-containing first gas and the water-containing second gas may be reacted so that the mixture comprises the element carbon from the methane-containing first gas and element oxygen from the water-containing second gas as carbon dioxide.

A first mixture is formed from a second mixture if the first mixture comprises one or more elemental constituents from the second mixture. For example, a first mixture comprising elemental carbon, elemental hydrogen, and elemental oxygen as carbon dioxide and hydrogen may be formed via a shift reaction of a second mixture comprising elemental carbon, elemental hydrogen and elemental oxygen as carbon monoxide and water. Also a first mixture is formed from a second mixture if the first mixture comprises the second mixture and therefore having compositions that are the same. A first mixture is formed from a second mixture if the first mixture comprises at least a portion of the second mixture.

The $H_2$ product gas stream, $CO_2$ by-product stream, and residual gas stream may be formed from the reformed gas mixture by any number of means. As exemplified in FIG. 1, the $CO_2$ by-product stream 691 is formed from reformed gas mixture 612, after passing though heat exchangers 680 and 690 and shift reactor 602, as an effluent from a $CO_2$ extractor 320. A $CO_2$-depleted reformed gas mixture 693 is withdrawn from $CO_2$ extractor 320 and passed to pressure swing adsorber 330 where the $H_2$ product gas stream 699 and residual gas stream 698 are formed from the $CO_2$-depleted reformed gas mixture as effluents from pressure swing adsorber 330. Since the $CO_2$-depleted reformed gas mixture is formed from the reformed gas mixture, the resultant $H_2$ product gas stream 699 and residual gas stream 698 are formed from reformed gas mixture 612.

Alternatively, the reformed gas mixture 612, after passing through an optional shift reactor, may be passed first to a pressure swing adsorber to form the hydrogen product stream and an intermediate residual gas stream. The intermediate residual gas stream may then be passed to a $CO_2$ extractor to form the $CO_2$ by-product stream and the residual gas stream. The residual gas stream may contain less than 10 mole % $CO_2$ and less than 65 mole % $H_2$.

Yet in another alternative, the reformed gas mixture 612 may be passed to a pressure swing adsorption system that produces a $H_2$ product stream, a $CO_2$ product stream and a residual gas stream as discussed for example in U.S. Pat. No. 4,914,218.

The $CO_2$ extractor may employ any known method for extracting $CO_2$. For example, $CO_2$ scrubbing can be carried out using any known, commercially available scrubbing techniques and scrubbing materials. The Benfield aqueous alkaline scrubbing process, the Shell Sulfinol and the UOP™ Selexol™, Lurgi Rectisol®, BASF's aMDEA solvent extraction processes are examples of commercial techniques for removing $CO_2$ from gas streams that are useful. Alternatively, $CO_2$ may be extracted by pressure swing adsorption, chemical absorption, membrane separation, complex metal oxides, condensation, distillation and the like. In some methods, the gas feed to the $CO_2$ extractor may be cooled in a heat exchanger prior to being introduced into the $CO_2$ extractor.

Pressure swing adsorption (PSA) may be used for separation of $CO_2$ from a mixture of gases. In PSA techniques, at a high partial pressure, solid molecular sieves adsorb $CO_2$ more strongly than some other gases. As a result, at elevated pressures, $CO_2$ is removed from the mixture of gases as this mixture is passed through an adsorption bed. Regeneration of the bed is accomplished by depressurization and purging. Typically for critical operations, a plurality of adsorption vessels are used for continuous separation of $CO_2$, wherein one adsorption bed is utilized for $CO_2$ separation while the others are regenerated.

Another technique for separation of $CO_2$ from a gas stream is chemical absorption using oxides, such as calcium oxide (CaO) and magnesium oxide (MgO) or a combination thereof. At elevated pressure and temperature, $CO_2$ may be absorbed by CaO forming calcium carbonate ($CaCO_3$), thereby removing $CO_2$ from the gas mixture. The sorbent CaO is regenerated by calcinations of $CaCO_3$, which can again reform $CaCO_3$ to CaO.

Membrane separation technology may also be used for separation of $CO_2$ from a gas stream. The membranes used for high temperature $CO_2$ extraction include zeolite and ceramic membranes, which are selective to $CO_2$. However, the separation efficiency of membrane technology is low, and complete separation of $CO_2$ may not be achieved through membrane separation.

Yet another technique used for extraction of $CO_2$ may include, by it not limited to, chemical absorption of $CO_2$ using amines. The feed to the $CO_2$ extractor is cooled to a suitable temperature to use chemical absorption of $CO_2$ using amines. This technique is based on alkanol amines solvents that have the ability to absorb $CO_2$ at relatively low temperature and are easily regenerated by raising the temperature of the rich solvents. A $CO_2$-rich stream is obtained after regeneration of the rich solvent. The solvents used in this technique may include, for example, triethanolamine, monoethanolamine, diethanolamine, diisopropanolamine, diglycolamine, and methyldiethanolamine. Another technique for separating $CO_2$ may by physical absorption. It may be noted than all or a combination of any of the techniques described above for $CO_2$ separation can be used to separate $CO_2$ advantageously.

Pressure swing adsorption is a well-known process used in hydrogen production for purification. The pressure swing adsorber and process can incorporate any desired number of adsorbent beds and any known processing cycles for recovering product hydrogen. Any suitable adsorbent material having desirable selectivity for purposes of the method can be used in the practice of the method. Suitable adsorbents include, for example, zeolitic molecular sieves, activated carbon, silica gel, activated alumina and the like. Zeolitic molecular sieve adsorbents are generally desirable for separation and purification of hydrogen from reformed gas mixtures.

The method optionally comprises introducing a first portion 696 of the residual gas stream into shift reactor 602. The first portion of the residual gas stream has a mass flow rate, $W_1$. $W_1$ may be zero since this step is optional. A first portion 696 of the residual gas stream may be formed from the residual gas stream 698. Compressor 340 may be used to increase the pressure of the first portion 696 of the residual gas stream.

Shift reactors, also called water-gas shift reactors, and their operation are well-known in the art. One or more shift reactors may be employed. Shift reactors comprise a vessel containing a catalyst bed through which CO and $H_2O$ flows to form $H_2$ and $CO_2$. The one or more shift reactors may be high temperature, medium temperature, low temperature, and/or isothermal shift reactors. High temperature shift reactors may operate at about 350° C. to 450° C. and typically use a non-noble metal catalyst such as mixture of $Fe_3O_4$ and $Cr_2O_3$ (i.e. about 55 wt % Fe and 6% Cr). Low temperature shift reactors may operate at about 200° C. to 260° C. and may use a non-noble catalyst such as Cu—ZnO—$Al_2O_3$, or Cu—ZnO—$Cr_2O_3$. Medium temperature shift reactors operate in the same temperature range as low temperature shift reactors and use a similar catalyst. Low temperature shift reactors are used in combination with high temperature shift reactors, whereas medium temperature shift reactors may be operated without an upstream high temperature shift reactor. Medium temperature shift catalyst is designed to withstand a higher temperature rise through the catalyst bed. Some CO survives the water-gas shift reaction.

The method comprises forming a reformer feed gas mixture stream 610 from a feed steam stream 603, a second portion 695 of the residual gas stream, and a reformer feedstock stream 1. The reformer feedstock stream comprises a hydrocarbon.

A feed steam stream is any stream comprising 90 to 100 mass % steam that is used to form a reformer feed gas mixture stream. A feed steam stream may comprise 99 to 100 mass % steam. Generally a feed steam stream will be steam containing only minor amounts of other components or impurities. The feed steam stream has a first steam mass flow rate, $R_1$. The first steam mass flow rate, $R_1$, is the mass flow rate of the steam component in the feed steam stream. In case the steam concentration is 95 mass %, the first steam mass flow rate is 95% multiplied by the total mass flow rate of the stream. Since the indefinite articles "a" and "an" as used herein mean one or more when applied to any feature in the specification and the claims, one or more feed steam streams may be used to form the reformer feed gas mixture. The first steam mass flow rate, $R_1$, then represents the totalized steam mass flow rate for the one or more feed steam streams.

The second portion 695 of the residual gas stream is formed from the residual gas stream 698. Compressor 340 may be used to increase the pressure of the second portion 695 of the residual gas stream. The second portion of the residual gas stream has a mass flow rate, $W_2$.

As shown in FIG. 1, the second portion of the residual gas stream may be introduced at various locations in the process.

The second portion 695 of the residual gas stream may be mixed with a reformer feedstock stream 1 prior to any processing. Depending on whether desulphurization of the reformer feedstock stream is required and also depending on the $H_2$ concentration in the reformer feedstock and/or the second portion of the residual gas stream, $H_2$ may be added through $H_2$ stream 2. The order of mixing the $H_2$, the second portion of the residual gas stream and the reformer feedstock stream is not important. The mixture may be passed to an optional hydrodesulphurization unit 300 to remove sulfur and form a sulfur-depleted reformer feedstock. Sulfur in the reformer feedstock may be removed to prevent poisoning of any reforming catalyst. Feed steam stream 603 may be added to sulfur-depleted reformer feedstock and the resultant mixture passed to optional prereformer 605 to form reformed feed gas mixture stream 610. Multiple prereformers may be used in parallel and/or series. The various streams may exchange heat with combustion product gases and/or the reformed gas mixture as is known in the art.

Additionally or alternatively, the second portion 695 of the residual gas stream may be mixed with a sulfur-depleted reformer feedstock, i.e. after the reformer feedstock has passed through optional hydrodesulphurization unit 300.

Yet additionally or alternatively, the second portion 695 of the residual gas stream may be mixed with a prereformer effluent, i.e. after the reformer feedstock has been mixed with steam stream 603 and passed through prereformer 605.

Prereformer 605 may be an adiabatic prereformer or a convective prereformer. Prereformers are well-known in the art. A prereformer is defined herein as any unfired vessel used to convert feedstock containing elemental hydrogen and elemental carbon to synthesis gas by reaction with steam over a catalyst with or without heating. A prereformer may be an adiabatic fixed bed reactor. A prereformer may be a tubular reactor. A prereformer generally employs a different type of catalyst than a primary reformer, for example a high activity, high nickel content catalyst. Temperatures in a prereformer may be in the range of about 800° F. (400° C.) to about 1100° F. (600° C.). Heat to a prereformer may be provided from combustion product (exhaust) gases from a reformer or other source, but is characterized by the lack of direct radiation heating by a combustion flame. A prereformer and a reformer may be physically connected. The $H_2$ concentration in a prereformer effluent is typically less than 20 mole % $H_2$, whereas the $H_2$ concentration in a reformer effluent is typically greater than 45 mole % $H_2$. The $CH_4$ concentration in a prereformer effluent is typically about 25 mole % $CH_4$, whereas the $CH_4$ concentration in a reformer effluent is typically less than about 6 mole % $CH_4$.

A reformer feedstock stream is any stream (excluding the residual gas stream) comprising a hydrocarbon suitable for use in a reforming reaction to form hydrogen. The hydrocarbon may be any $C_1$ to $C_5$ alkane or alkene or any other hydrocarbon known and used for steam-hydrocarbon reforming. A reformer feedstock stream may be, for example, a natural gas stream, or a purified methane stream. Other reformer feedstock may include any hydrocarbon containing stream such as propane, vaporized butane, vaporized naphtha, or refinery fuel gas (RFG). Since the indefinite articles "a" and "an" as used herein mean one or more when applied to any feature in the specification and claims, one or more reformer feedstock streams comprising a hydrocarbon may be used to form the reformer feed gas mixture. The reformer feedstock stream may comprise one or more hydrocarbons.

A reformer feed gas mixture stream is any stream containing a gas mixture comprising steam and at least one hydrocarbon suitable for introducing into a reformer to generate hydrogen. The reformer feed gas mixture is generally referred to as "mixed feed." The reformer feed gas mixture stream may be formed by mixing the reformer feedstock stream 1 and the feed steam stream 603. The reformer feed gas mixture stream may be formed by mixing a feed steam stream and a reformer feedstock stream and passing the mixture through an optional prereformer 605. The reformer feedstock stream may have a steam-to-carbon ratio of 1.5 to 5 on a molar basis. Sulfur may be removed from the reformer feedstock stream in hydrodesulphurization unit 300.

The method comprises introducing the reformer feed gas mixture stream 610 into a plurality of catalyst-containing reformer tubes 625 of a catalytic steam reformer 600 and reacting the hydrocarbon with the steam in a reforming reaction under reaction conditions effective to form a reformed gas mixture 612. The reformer feed gas mixture may be distributed to the plurality of catalyst-containing reformer tubes through a header.

The reaction to convert feedstock with steam over a catalyst occurs in the reaction section of the reformer which is inside of catalyst-containing reformer tubes 625. A catalytic steam reformer may have a plurality of catalyst-containing reformer tubes through which the reformer feed gas mixture is passed to form a reformed gas mixture. As used herein, plurality means three or more. A catalytic steam reformer may have up to 1100 catalyst-containing reformer tubes. Catalyst-containing reformer tubes are reactors, generally tubular in shape, that have been loaded with catalyst in the form of pellets, structured packing, or other catalyst-containing packing known in the art. The cross-section of the tubes may be circular or other desired shape. Suitable catalysts for reforming reformer feedstock are known in the art. Suitable materials for making reformer tubes are known in the art.

Reaction conditions effective to form a reformed gas mixture include a temperature in the range of 500° C. to 1200° C. and a pressure in the range of 1 to 50 atm. Preferred reaction conditions are known in the art.

The method comprises introducing a fuel stream 632 comprising combustible gases into a combustion section 650 of the reformer 600. The fuel stream comprises a third portion 630 of the residual gas stream and a supplemental fuel stream 634. The third portion of the residual gas stream has a mass flow rate, $W_3$. At least a portion of the fuel may be preheated by heat exchange (not shown) between a combustion product gas mixture and/or reformed gas mixture.

Since the indefinite articles "a" and "an" as used herein mean one or more when applied to any feature in the specification and the claims, one or more fuel streams may be introduced into the combustion section of the reformer. The third portion of the residual gas stream and the supplemental fuel stream may be mixed and introduced together or introduced separately, as desired.

Supplemental fuel introduced into the combustion section of the reformer may be any fuel suitable for providing heat by combustion in the reformer. The supplemental fuel may include refinery fuel gas, refinery off-gas, natural gas, purified methane, propane and the like.

Pressure swing adsorber residual gas typically has a low concentration of $H_2$. Consequently, the fuel may have a $H_2$ concentration of 0 to less than 50 mole % $H_2$ or 0 to 20 mole % $H_2$. The $H_2$ concentration of the fuel is based on the resultant combined streams of one or more supplemental fuel streams and third portion of the residual gas stream.

90% to 100% of the heat for reforming may be provided by combustion of the third portion of the residual gas stream. The proportion of energy provided by the third portion of the residual gas stream or the supplemental fuel may be calculated from the available heat provided by each stream. Available heat is the gross quantity of heat released within a combustion chamber minus both the dry flue gas loss and the moisture loss. It represents the quantity of heat remaining for useful purposes and to balance heat losses to wall, openings, conveyors, etc. The concept of available heat is well-known and is discussed for example in the North American Combustion Handbook, Vol. 1, $3^{rd}$ Ed., published by the North American Mfg. Co. The percent heat energy from residual gas is the available heat from the third portion of the residual gas stream divided by the total heat provided by both the third portion of the residual gas stream and the supplemental fuel stream expressed as a percentage.

The combustion section of the reformer is the section wherein combustion occurs. Generally a flame is visible, however flameless combustion may also be used.

The method comprises introducing an oxidant stream 633 containing oxygen into the combustion section 650 of the reformer 600. The oxidant stream may be air having an oxygen concentration of about 21 mole %. The oxidant stream may be oxygen-enriched air having an oxygen concentration of greater than 21 mole % to 70 mole %. The oxidant stream may be oxygen-depleted air having an oxygen concentration of 13 mole % to less than 21 mole % or 15 mole % to less than 21 mole %, for example exhaust from a gas turbine. At least a portion of the oxidant stream may be introduced through lances. The oxidant stream may be preheated having a temperature of 100 to 600° C. The oxidant stream may be preheated by heat exchange (not shown) between a combustion product gas mixture 660 and/or reformed gas mixture 612.

At least a portion of the fuel may be premixed with oxidant prior to introducing the fuel into the combustion section 650. At least a portion of the fuel may be introduced through fuel lances. To ensure substantially complete combustion of the fuel, a molar ratio of oxygen to fuel is generally provided with a stoichiometry so as to provide about 5 to 10 mole % excess oxygen. Consequently, oxygen is present in the combustion product gas mixture.

Fuel and oxidant may be introduced through burners. Burners for use with reformers are available commercially.

The method comprises combusting the fuel with the oxygen in the combustion section 650 under conditions effective to combust the fuel to form a combustion product gas mixture 660 and generate heat to supply energy for the reforming reaction.

Conditions effective to combust the fuel to form a combustion product gas mixture include a furnace temperature in the range of 700° C. to 2500° C. and a pressure in the range of 0.9 to 1.1 atm. In air, the ignition temperature of $CH_4$ is about 700° C. The furnace temperature is a furnace gas temperature in the combustion section of the reformer outside of the flame envelope and may be determined by a suction pyrometer.

Suitable conditions include a furnace temperature in the range of 1500° C. to 2500° C. or 1700° C. to 2300° C. and a pressure in the range of 0.9 to 1.1 atm. Preferred combustion conditions in reformers are known in the art.

When the fuel and oxygen are combusted, heat is generated and a combustion product gas mixture 660 is formed. Heat is transferred to the plurality of catalyst-containing reformer tubes 625 thereby supplying energy for the endothermic reforming reaction. The combustion product gas mixture is any gas mixture resulting from at least partial combustion of the fuel and the oxygen and comprises $CO_2$ and $H_2O$. The combustion product gas mixture may comprise $H_2O$, $CO_2$, $N_2$, $O_2$, and generally lesser amounts of CO and unburned hydrocarbons.

The combustion product gas mixture may also comprise NOx or other pollutant gases. NOx reduction techniques known in the art of industrial combustion may be used, for example flue gas recirculation, fuel staging, oxygen staging, selective catalytic or non-catalytic reduction with ammonia, etc.

The method comprises withdrawing the combustion product gas mixture 660 from the combustion section 650 of the reformer. The combustion product gas mixture may be passed to a convection section 620 of the reformer where heat may be transferred from the combustion product gas mixture to other streams thereby increasing the efficiency of the overall process.

The method comprises generating an intermediate gas stream 655 comprising steam from a liquid water-containing stream 677 via indirect heat exchange between the liquid water-containing stream 677 and at least one of a stream formed from the reformed gas mixture 612 and a stream formed from the combustion product gas mixture 660. FIG. 1 shows heat exchange between liquid water-containing stream 677 and reformed gas mixture 612 in heat exchanger 680. The steam generation rate in heat exchanger 680 may be modified by use of a bypass (not shown). Although not shown in FIG. 1, alternatively or additionally, heat exchange between a liquid water-containing stream and combustion product gas mixture 660 may be performed in the convection section 620 of the reformer. The intermediate gas stream 655 comprising steam has a pressure of 2 MPa to 12 MPa and a second steam mass flow rate, $R_2$. The ratio of the second steam mass flow rate, $R_2$, to the first steam mass flow rate, $R_1$, is 0.9 to 1.2. The ration of the second steam mass flow rate, $R_2$, to the first steam mass flow rate, $R_1$, may be 0.9 to 1.1. This means that the system produces about the same amount of steam needed for the reformer.

The intermediate gas stream comprising steam may have a pressure of 2 MPa to 5 MPa. When steam is generated for export, the pressure requirement is typically greater than that required for forming the mixed feed. An advantage of the present method is that lower pressure steam may be generated. This lower pressure steam may be suitable for use in the reformer but not suitable for steam export.

An intermediate gas stream comprising steam is any stream comprising 90 to 100 mass % steam or 99 to 100 mass % steam produced via indirect heat exchange between a liquid water-containing stream and at least one of a stream formed from the reformed gas mixture and a stream formed from the combustion product gas mixture. Generally an intermediate gas stream comprising steam will be steam containing only minor amounts of other components or impurities. Since the indefinite articles "a" and "an" as used herein mean one or more when applied to any feature in the claims, one or more intermediate gas stream comprising steam may be generated via indirect heat exchange between one or more liquid water-containing streams and one or more streams formed from the reformed gas mixture or the combustion product gases. The second steam mass flow rate, $R_2$, then represents the totalized steam mass flow rate of the one or more intermediate gas streams comprising steam, each having a pressure of 2 MPa to 12 MPa.

As shown in FIG. 1, separation of gaseous steam from liquid water may be aided by use of optional steam drum 640.

In the method, 80% to 100% of the second steam mass flow rate, $R_2$, may be generated via indirect heat exchange between the liquid water-containing stream and the stream formed from the reformed gas mixture.

In the method, 0 to 20% of the second steam mass flow rate, $R_2$, may be generated via indirect heat exchange between the liquid water-containing stream and the stream formed from the combustion product gases.

In case multiple streams are used to form the intermediate gas stream, the percentage of the second steam mass flow rate, $R_2$, attributed to indirect heat exchange between the liquid water-containing stream and the stream formed from the reformed gas mixture may be determined by an energy balance. The total energy, QT, to produce the second steam mass flow rate may be found by determining the heat extracted from each of streams used to produce the second steam mass flow rate. The heat extracted is a function of the composition, mass flow rate and temperature change. The percentage of the second steam mass flow rate attributed to indirect heat exchange between the liquid water-containing stream and the stream containing the reformed gas mixture is the ratio of the heat extracted from the stream containing the reformed gas mixture to the total energy extracted expressed as a percentage.

The rate of steam production may be balanced with the rate of steam consumption in the reformer. It may be preferable to integrate steam production and consumption within the production facility 601, however nothing prevents at least partial exchange of steam between the production facility and some other nearby facility. In the method $R_2$ may equal $R_1$ and 100% of the second steam mass flow rate, $R_2$, may be generated via indirect heat exchange between the liquid water-containing stream 677 and at least one of the stream formed from the reformed gas mixture 612 and the stream formed from the combustion product gases 660.

Less than 35 mass % of the residual gas mixture may be recycled back to the optional shift reactor and/or to form the reformer feed gas mixture stream. Alternatively stated, $$\frac{W_1 + W_2}{W_T} < 0.35,$$

where $W_1$ is the mass flow rate of the first portion 696 of the residual gas mixture introduced into the shift reactor, $W_2$ is the mass flow rate of the second portion 695 of the residual gas stream used to form the reformer feed gas mixture stream, and $W_T$ is the total mass flow rate of the residual gas stream 698.

Less than 25 mass % of the residual gas mixture may be recycled back to the optional shift reactor and/or to form the reformer feed gas mixture stream. Alternatively stated, $$\frac{W_1 + W_2}{W_T} < 0.25.$$

Most or all of the residual gas mixture that is recycled may be recycled as the second portion 695 of the residual gas stream to form the reformer feed gas mixture stream. Zero to 10 mass % of the residual gas stream may be recycled as the first portion 696 of the residual gas stream to the shift reactor, i.e.

$$0 \leq \frac{W_1}{W_T} \leq 0.1.$$

In case steam production and consumption is integrated within the production facility, the method may further comprise replenishing the feed steam stream 603 from a stream formed from at least a portion of the intermediate gas stream 655 comprising steam, as shown in FIG. 1. Steam generated within the process using heat from the reformed gas mixture is used to feed the reformer 600 as the feed steam stream 603.

The method may further comprise superheating the intermediate gas stream 655 via indirect heat exchange between the intermediate gas stream and at least a portion of the stream formed from the reformed gas mixture or another stream formed from the reformed gas mixture (not shown) thereby forming a superheated intermediate gas stream 656. One skilled in the art can certainly imagine various ways the reformed gas mixture can be used to generate steam and superheat the steam other than explicitly disclosed herein. The method may further comprise replenishing the feed steam stream from a stream formed from at least a portion of the superheated intermediate gas stream as shown in FIG. 1.

Additionally or alternatively to superheating the intermediate gas stream via heat exchange with the reformed gas mixture, the method may comprise superheating the intermediate gas stream via indirect heat exchange between the intermediate gas stream and at least a portion of the stream formed from a combustion product gas mixture thereby forming a superheated intermediate gas stream. One skilled in the art can imagine various ways the reformed gas mixture and the combustion product gas mixture can be used to generate the steam and superheat the steam other than those disclosed explicitly herein. The method may further comprise replenishing the feed steam stream from at least a portion of the superheated intermediate gas stream.

Independent of whether the intermediate gas stream is heated by a stream formed from the reformed gas mixture or a stream formed from the combustion product gas mixture, the superheated intermediate gas stream may be superheated by 40 to 125° C. To superheat is to heat a vapor so as to cause the vapor remain free from suspended liquid droplets. Indicating that a gas stream is superheated by 40° C. means that the difference between the actual temperature and the saturation temperature is 40° C.

The method may further comprise superheating the intermediate gas stream 655 via indirect heat exchange between the intermediate gas stream and at least a portion of a stream formed from the reformed gas mixture 612 thereby forming a superheated intermediate gas stream 656 and passing at least a portion of the superheated intermediate gas stream 656 through a steam turbine 597 to generate power and thereby forming a steam turbine effluent 657 from the superheated intermediate gas stream 656. At least a portion of the steam turbine effluent 657 may be used for replenishing the feed steam stream 603.

The power generated by the steam turbine 597 may be used to power compressor 340. The steam turbine may generate electricity and the electricity used to power a compressor. The shaft work from the steam turbine may be integrated with a compressor. For example a compressor/expander or commander may be used to combine turbine 597 with compressor 340.

Low grade heat remaining in the reformed gas mixture and combustion product gases may be recovered by generating low pressure steam. A second intermediate gas stream comprising steam may be generated in boilers (not shown) from a second liquid water-containing stream (not shown) and at least one of a stream formed from the reformed gas mixture and a stream formed from the combustion product gas mixture. The second intermediate gas stream comprising steam may have a pressure of 130 kPa to 450 kPa. This second intermediate gas stream may be used in the deaerator, regenerating the solvent in a $CO_2$ removal unit, and/or other useful purpose.

Since the pressure of this low pressure stream does not have a pressure of 2 to 12 MPa, this steam is not counted in $R_2$.

The present invention will be better understood with reference to the following examples, which are intended to illustrate, but not to limit the scope of the invention. The invention is solely defined by the claims.

EXAMPLES

Example 1

Figure 2:
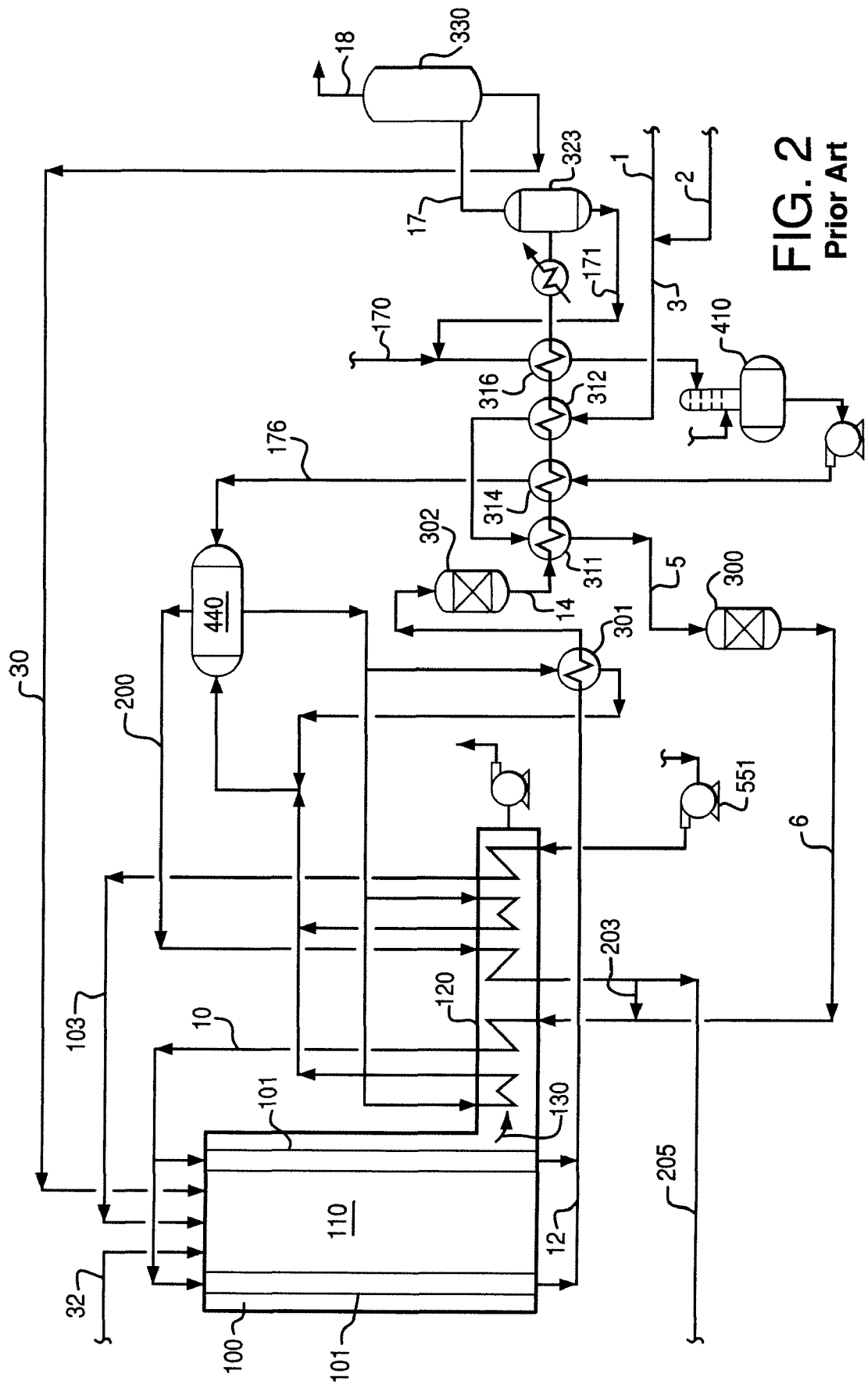
FIG. 2 is a process flow diagram exemplifying a prior art-type production facility for generating hydrogen and generating export steam.

The configuration according to Example 1 is shown in FIG. 2. FIG. 2 is a process flow diagram for a prior art-type hydrogen production facility. A reformer feedstock 1, in this example, natural gas is mixed with a hydrogen recycle stream 2 to form a hydrogen-containing feed stream 3. The hydrogen-containing feed stream 3 is heated via indirect heat exchange with a shift reactor effluent stream 14 from shift reactor 302 in heat exchangers 311 and 312. The shift reactor effluent stream 14 is formed from a reformed gas mixture 12 from the reformer 100 by reaction in shift reactor 302.

The heated hydrogen-containing feed stream 5 is introduced into hydrodesulphurization unit 300 to remove sulfur and form a sulfur-depleted reformer feedstock 6. Sulfur in the reformer feedstock is removed to prevent poisoning of reforming catalyst.

Reformer feed gas mixture stream 10 is formed from feed steam stream 203 and sulfur-depleted reformer feedstock 6 by mixing followed by indirect heat exchange with combustion product gases in the convection section 120 of the reformer 100. The reformer feed gas mixture stream 10 is introduced into a plurality of catalyst-containing reformer tubes 101 of the catalytic steam reformer 100 where hydrocarbons and steam are reacted in a reforming reaction to form synthesis gas. The synthesis gas is withdrawn from the plurality of catalyst-containing reformer tubes 101 as reformed gas mixture 12 comprising hydrogen. The reformed gas mixture may also comprise carbon dioxide, carbon monoxide, water, and methane.

Heat for the reforming reaction is provided by combusting a fuel and air in the combustion section 110 of the reformer 100.

Fuel is provided by pressure swing adsorber (PSA) residual gas 30, which is introduced into the combustion section 110. The PSA residual gas is also called PSA purge gas and contains $H_2$, CO, $CH_4$ and other gases and is therefore suitable as a fuel. Fuel for combustion is also provided by a supplemental fuel 32, which is introduced into the combustion section 110. The supplemental fuel is also called trim fuel and in this example is natural gas.

Air is introduced into the combustion section 110 as preheated combustion air 103. Preheated combustion air 103 is formed using a compressor or blower 551 and a heat exchanger in the convection section 120.

A combustion product gas mixture 130 is withdrawn from the combustion section 110 and used to heat various streams in convection section 120 by indirect heat exchange.

In the process flow diagram in FIG. 2, steam is generated from a variety of heat sources. Make-up water 170 and water 171 from water separator 323 are heated and fed to deaerator 410. Water 176 which has been preheated and deaerated in deaerator 410, is fed into a into a steam drum 440. The steam drum is typically elevated. Water from the steam drum is directed to heat exchangers in the convection section 120 which provide indirect heat exchange between the water and the combustion product gas mixture 130. Water from the steam drum 440 is also directed to heat exchanger 301 which provides indirect heat exchange between the water and the reformed gas mixture 12. A two-phase mixture of steam and water flow from each of the heat exchangers in the convection section 120 and heat exchanger 301 back to the steam drum. A saturated stream of steam 200 is withdrawn from the steam drum 440 while liquid water is recirculated to the heat exchangers to form more steam. The saturated stream of steam 200 is superheated in another heat exchanger in the convection section 120. The superheated steam is used to replenish the feed steam stream 203 and to form export steam 205.

The reformed gas mixture 12 is passed through high temperature shift reactor 302 to form shift reactor effluent 14. The shift reactor effluent is passed through various heat exchangers 311, 312, 314, 316, water separator 323 and to a pressure swing adsorber system 330. Water is removed as stream 171 and a hydrogen containing stream 17 is passed to the pressure swing adsorber system 330. Pressure swing adsorber system 330 separates the hydrogen from the other components in the shifted reformed gas mixture to form a product hydrogen stream 18 and a PSA residual gas 30.

The process shown in the process flow diagram in FIG. 2 was modeled using commercial process simulator software. Natural gas is used as the reformer feedstock in all of the Examples.

Input parameters and results for this configuration are summarized in Table 1. Input parameters include the steam-to-carbon ratio, S/C, and the effective or overall oxygen to nitrogen molar ratio for oxidants introduced into the combustion section, $O_2/N_2$. The results include the ratio of steam used for reforming to the total steam produced, $S/S_T$, and the normalized net specific energy and the normalized gross specific energy. The total steam produced, $S_T$, is the total steam produced having a pressure greater than 2 MPa. Low grade steam is not included in $S_T$.

The gross specific energy, GSE, is the sum of the Higher Heating Value ($J/Nm^3$) of the supplemental fuel, $HHV_{fuel}$, introduced into the combustion section multiplied by the flow rate of the fuel ($Nm^3/h$), $F_{fuel}$, and the Higher Heating Value ($J/Nm^3$) of the reformer feedstock, $HHV_{feed}$, introduced into the reformer multiplied by the flow rate of the reformer feedstock ($Nm^3/h$), $F_{feed}$, the sum divided by the hydrogen production rate (Nm3/h), HPR, expressed in the units $J/Nm^3$; mathematically $$GSE = \frac{HHV_{fuel} * F_{fuel} + HHV_{feed} * F_{feed}}{HPR}.$$

The net specific energy, NSE, is the Higher Heating Value (J/Nm³) of the supplemental fuel, $HHV_{fuel}$, introduced into the combustion section multiplied by the flow rate of the fuel (Nm³/h), $F_{fuel}$, plus the Higher Heating Value (J/Nm³) of the reformer feedstock, $HHV_{feed}$, introduced into the reformer multiplied by the flow rate of the reformer feedstock (Nm³/h), $F_{feed}$, minus the enthalpy difference between the export steam and water at 25° C., ΔH, in J/kg multiplied by the mass flow of the export steam, $F_{steam}$, in kg/h, all divided by the hydrogen production rate (Nm³/h), HPR, expressed in the units J/Nm³; mathematically $$NSE = \frac{HHV_{fuel} * F_{fuel} + HHV_{feed} * F_{feed} - \Delta H * F_{steam}}{HPR}.$$

The gross specific energy is always greater than or equal to the net specific energy since no credit is given for the export steam. The gross and net specific energies are equal when no steam is exported.

All of the specific energy results in Table 1 are normalized with respect to the net specific energy of Example 1.

As shown in Table 1, according to the simulation results, about 53% of the steam produced in the system is recycled back to the reformer in the mixed feed. The normalized gross specific energy is about 16% greater than the normalized net specific energy. Without credit for the export steam, the specific energy is increased by about 16%.

Example 2

Figure 3:
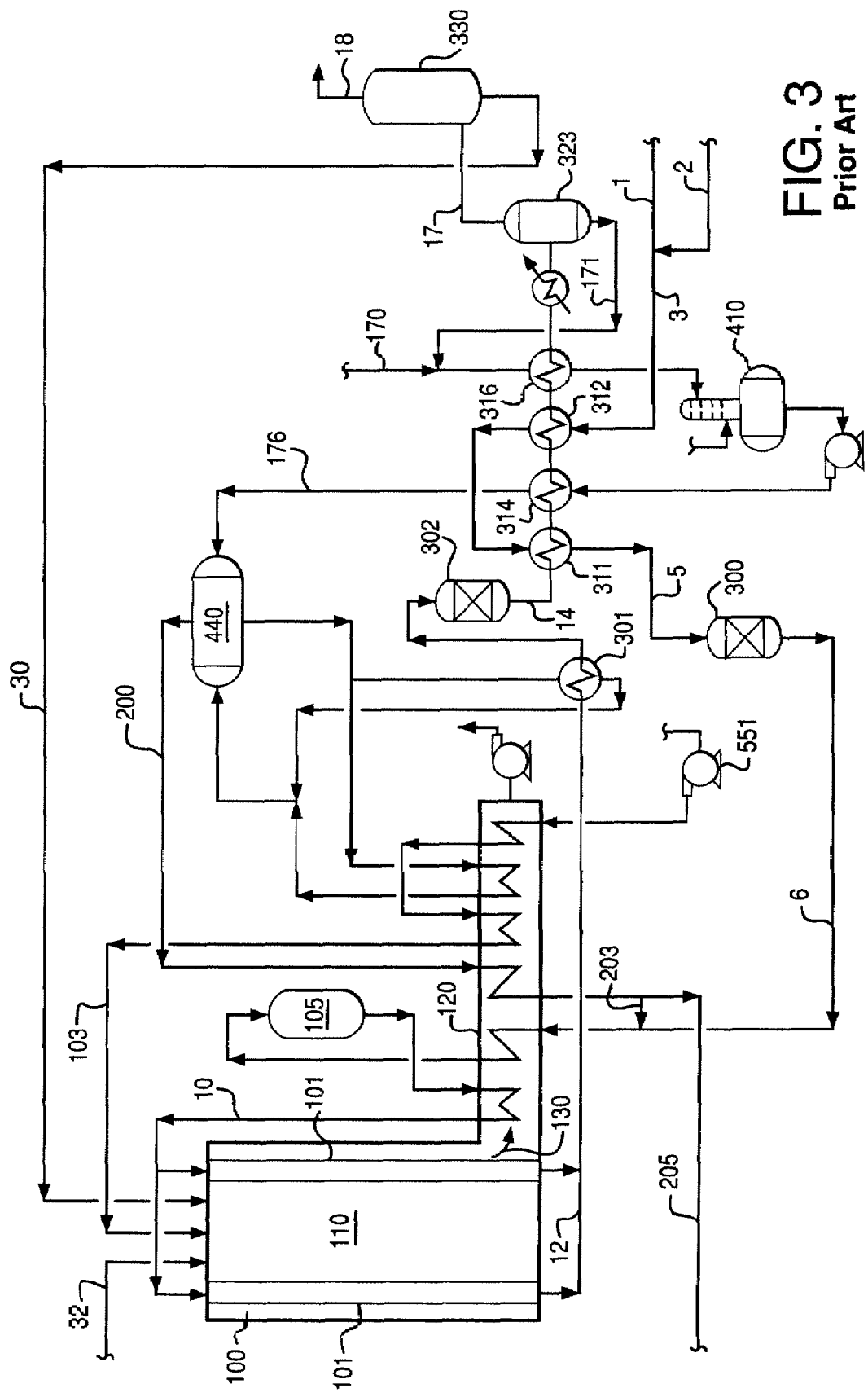
FIG. 3 is a process flow diagram exemplifying a prior art-type production facility for generating hydrogen and generating export steam, which includes a prereformer and high temperature shift reactor.

The configuration according to Example 2 is shown in FIG. 3. FIG. 3 is a process flow diagram for a prior art-type hydrogen production facility that includes a prereformer. With the exception of the adiabatic prereformer 105 and some heat exchangers, the configuration according to Example 2 is the same as the configuration according to Example 1 in FIG. 2. Where there are like elements in FIG. 2 and FIG. 3, like reference numbers are used.

A difference is that reformer feed gas mixture stream 10 is formed from feed steam stream 203 and sulfur-depleted reformer feedstock 6 by mixing followed by indirect heat exchange with combustion product gases in the convection section 120 of the reformer 100, prereforming in prereformer 105 and heating again in the convection section 120. Otherwise, the description of the configuration provided for Example 1 applies mutatis mutandis to the configuration of Example 2.

The process according to Example 2 was modeled using commercial process simulator software.

Input parameters and results for this configuration are summarized in Table 1.

As shown in Table 1, according to the simulation results, about 67% of the steam produced in the system is recycled back to the reformer in the mixed feed. These results show that a greater percentage of steam produced in the process is used by the process in the reformer. Alternatively stated, less steam is exported when a prereformer is used.

The normalized net specific energy is decreased about 0.3% compared to the net specific energy of Example 1. It means that the configuration in Example 2 is slightly better than the configuration of Example 1 since less energy is required to produce a specified amount of hydrogen. The gross specific energy for Example 2 is 7% greater than the net specific energy of Example 1. Without credit for the export steam, the specific energy is increased by about 7% over net specific energy for Example 1. This is a significant improvement over the gross specific energy of Example 1.

Example 3

Figure 4:
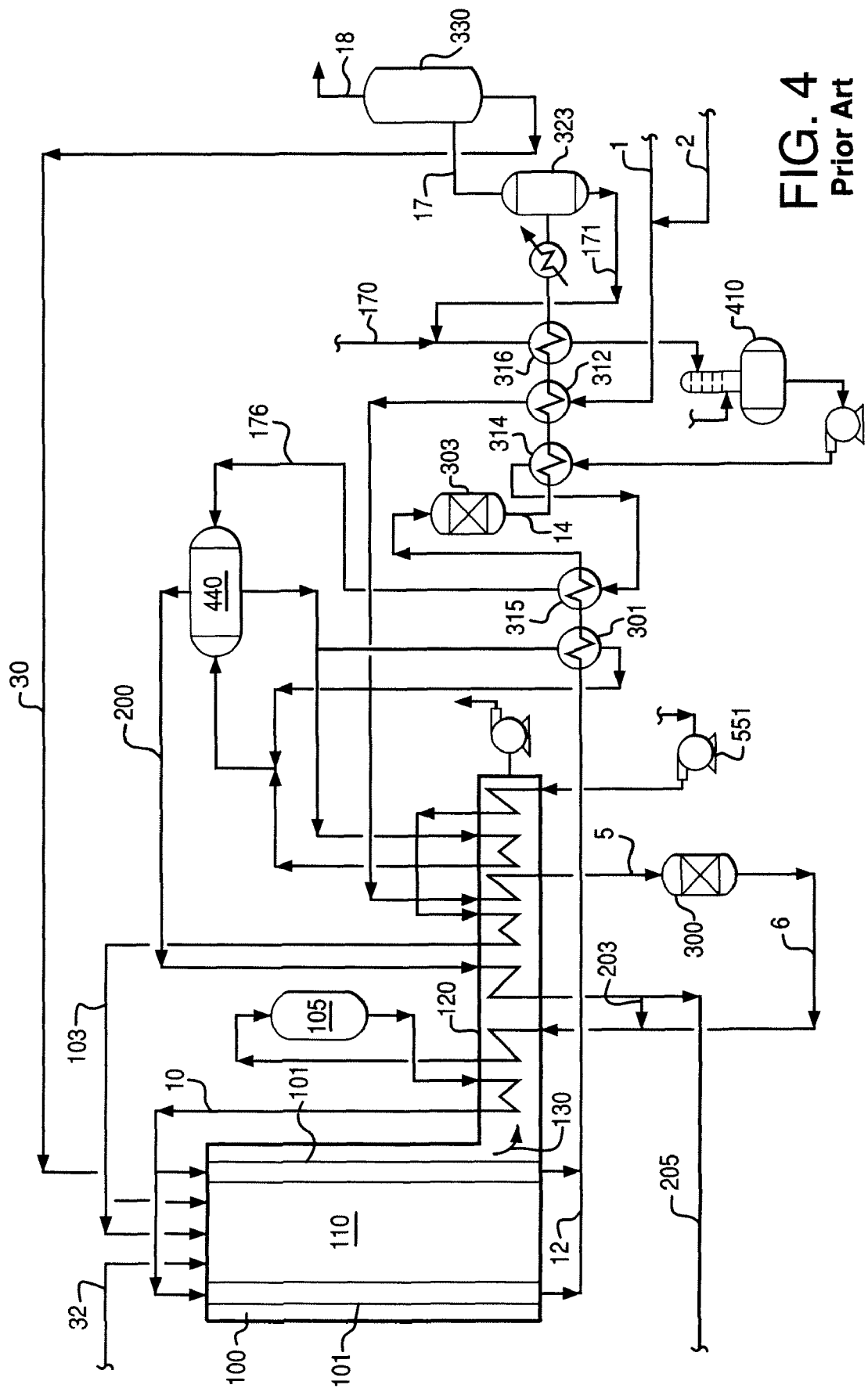
FIG. 4 is a process flow diagram exemplifying a prior art-type production facility for generating hydrogen and generating export steam which includes a prereformer and a medium temperature shift reactor.

The configuration according to Example 3 is shown in FIG. 4. FIG. 4 is a process flow diagram for a prior art-type hydrogen production facility that includes a prereformer. In this configuration a medium temperature shift reactor 303 is used in place of a high temperature shift reactor. Some of the heat recovery has been modified accordingly. Otherwise, the configuration of Example 3 is very similar to the configuration of Example 2. Where there are like elements in FIGS. 2, 3 and 4, like reference numbers are used.

The description of the configuration provided for Examples 1 and 2 apply mutatis mutandis to the configuration of Example 3. Differences will be apparent to one skilled in the art based on the process flow diagram.

The process according to Example 3 was modeled using commercial process simulator software.

Input parameters and results for this configuration are summarized in Table 1.

As shown in Table 1, according to the simulation results, about 64% of the steam produced in the system is recycled back to the reformer in the mixed feed. These results show that a greater percentage of steam produced in the process is used by the process in the reformer as compared to Example 1, but slightly less steam than in Example 2.

The normalized net specific energy is decreased about 1.5% compared to the net specific energy of Example 1. It means that by using a medium temperature shift reactor as in Example 3 instead of a high temperature shift reactor as in the configuration of Example 1, less energy is required to produce a specified amount of hydrogen. The gross specific energy for Example 3 is 8% greater than the net specific energy of Example 1. Without credit for the export steam, the specific energy is increased by about 8% over net specific energy for Example 1. This is a significant improvement over the gross specific energy of Example 1.

Example 4

Figure 5:
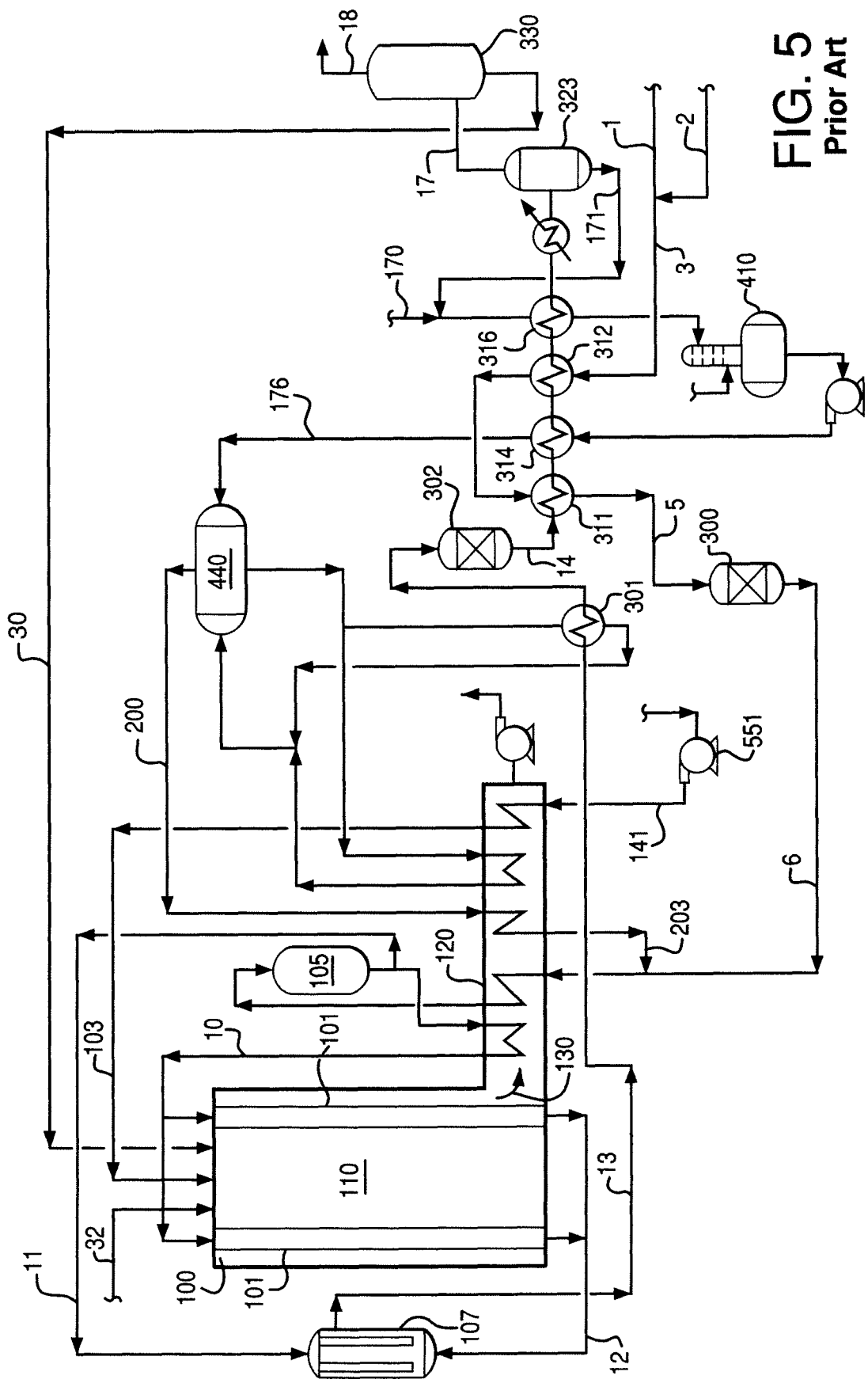
FIG. 5 is a process flow diagram exemplifying a prior art-type production facility for generating hydrogen, which includes an adiabatic prereformer, a high temperature shift reactor and a heat transfer reformer.

The configuration according to Example 4 is shown in FIG. 5. FIG. 5 is a process flow diagram for a prior art-type hydrogen production facility that includes a prereformer and a convective heat transfer reformer 107. A convective heat transfer reformer is described in U.S. Pat. No. 5,264,202. As shown in this example, a convective heat transfer reformer may be used to minimize or eliminate steam export. However, a problem is that a larger capital investment is required for the convective heat transfer reformer and/or a retrofit of an existing production facility is difficult.

The configuration according to Example 4 is similar to the configuration according to Example 2 in FIG. 3. Where there are like elements in FIG. 3 and FIG. 5, like reference numbers are used.

A difference is that effluent from the prereformer 105 is divided into reformer feed gas mixture stream 10 and convective heat transfer reformer feed stream 11. Convective heat transfer reformer feed stream 11 is introduced into reformer tubes in the convective heat transfer reformer 107. A stream comprising the reformed gas mixture 12 is introduced into convective heat transfer reformer 107 to provide heat for reforming the feed stream 11. An effluent stream 13 formed from the reformed gas mixture 12 and a mixture formed from reforming the feed stream 11 is withdrawn from the convective heat transfer reformer 107. Effluent stream 13 is passed through boiler 301, high temperature shift reactor 302 and various other heat exchangers downstream of the shift reactor 302.

Otherwise, the description of the configuration provided for Example 1 applies mutatis mutandis to the configuration of Example 4.

Input parameters and results for this configuration are summarized in Table 1.

The process according to Example 4 was modeled using commercial process simulator software.

As shown in Table 1, according to the simulation results, all of the steam produced in the system is recycled back to the reformer in the mixed feed. No steam is exported.

The normalized net specific energy is increased about 2.3% compared to the net specific energy of Example 1. It means that the configuration in Example 4 is slightly worse than the configuration of Example 1 since more energy is required to produce a specified amount of hydrogen. However, if no credit for export steam can be given, the configuration of Example 4 looks more attractive, since the penalty is only 2.3% compared to 16% for Example 1. The gross specific energy for Example 4 is 2.3% greater than the net specific energy of Example 1, while the gross specific energy for Example 1 is 16% greater than the net specific energy of Example 1.

Example 5

Figure 6:
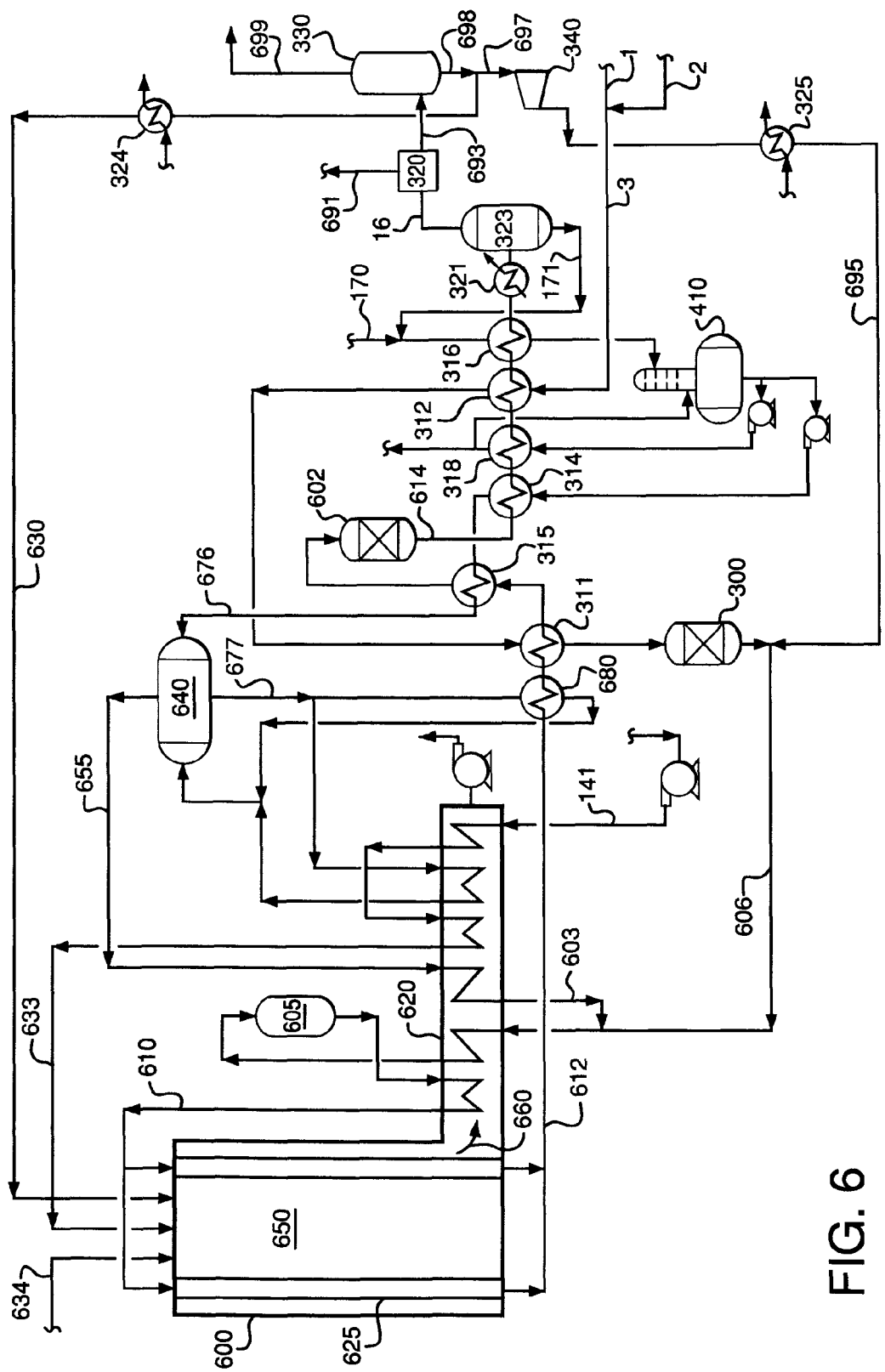
FIG. 6 is a process flow diagram exemplifying a production facility for generating hydrogen according to the present method.

The configuration according to Example 5 is shown in FIG. 6. FIG. 6 is a process flow diagram for a hydrogen production facility exemplifying the invention.

Reformer feed gas mixture stream 610 is introduced into a plurality of catalyst-containing reformer tubes 625 of the catalytic steam reformer 600 where hydrocarbons and steam are reacted in a reforming reaction to form synthesis gas. The synthesis gas is withdrawn from the plurality of catalyst-containing reformer tubes 625 as reformed gas mixture 612 comprising $H_2$, $CO_2$, CO, $CH_4$, and $H_2O$.

The reformed gas mixture 612 is passed through heat exchangers 680, 311, and 315 and then passed to water-gas shift reactor 602 to form shift reactor effluent 614. Shift reactor 602 contains medium temperature shift catalyst. The shift reactor effluent 614 is passed through heat exchangers 314, 318, 312, 316, and 321 and then to water separator 323. Water 171 from water separator 323 is recycled back into the process. Additional water for making steam is provided by make-up water 170. Water-depleted stream 16, which contains $CO_2$, $H_2$, and CO is passed to $CO_2$ extractor 320 where 99% of the $CO_2$ is removed from the stream thereby forming $CO_2$ by-product stream 691 and $CO_2$-depleted stream 693.

$CO_2$-depleted stream 693 is passed to pressure swing adsorber system 330. Pressure swing adsorber system 330 separates the hydrogen from the other components in the shifted reformed gas mixture to form a product hydrogen stream 699 and a PSA residual gas 698. PSA residual gas 698 is divided into a portion 630 of the residual gas and a portion 697 of the residual gas. Portion 630 is used to form a portion of the fuel to the reformer and portion 697 is used to form a portion of the feed to the reformer.

Reformer feedstock 1, in this example, natural gas is mixed with a hydrogen recycle stream 2 to form a hydrogen-containing feed stream 3. The hydrogen-containing feed stream 3 is heated via indirect heat exchange to form heated hydrogen-containing feed stream 5. Hydrogen-containing feed stream 3 is heated via indirect heat exchange with a shift reactor effluent stream 614 from shift reactor 602 in heat exchanger 312 and heated further via indirect heat exchange with reformed gas mixture 612 in heat exchanger 311. The shift reactor effluent stream 614 is formed from a reformed gas mixture 612 from the reformer 600 by reaction in shift reactor 602.

The heated hydrogen-containing feed stream 5 is introduced into hydrodesulphurization unit 300 to remove sulfur and form a sulfur-depleted reformer feedstock 306. Sulfur in the reformer feedstock is removed to prevent poisoning of reforming catalyst.

Portion 697 of the residual gas is compressed in compressor 340, heated in heat exchanger 325 thereby forming stream 695. Stream 695 is mixed with the sulfur-depleted reformer feedstock 306 from the hydrodesulphurization unit 300 thereby forming mixture stream 606. Mixture stream 606 is mixed with steam stream 603, heated in the convection section 620 of the reformer 600 and passed to prereformer 605. Effluent from the prereformer 605 is heated by indirect heat exchange with combustion product gases in the convection section 620 to form reformer feed gas mixture stream 610.

Reformer feed gas mixture stream 610 is formed from a prereformed mixture formed from feed steam stream 603, portion 697 of the residual gas stream after compression and heating, and reformer feedstock 1 after heating and hydrodesulphurization.

In this example, none of the residual gas 698 is recycled to the shift reactor.

Heat for the reforming reaction is provided by combusting a fuel and the oxygen in air in the combustion section 650 of the reformer 600.

Fuel is provided from portion 630 of the residual gas stream, which is heated in heat exchanger 324 and then introduced into the combustion section 650. Fuel for combustion is also provided by a supplemental fuel 634, which is introduced into the combustion section 650. In this example the supplemental fuel is natural gas.

Preheated air 633 is introduced into the combustion section 650. Preheated air 633 is formed by heating compressed air steam 101 by indirect heat exchange in convection section 620.

A combustion product gas mixture 660 is withdrawn from the combustion section 650 and used to heat various streams in convection section 620 by indirect heat exchange.

In the process flow diagram in FIG. 6, steam is generated by indirect heat exchange between water and a stream formed from reformed gas mixture 612 and between water and a stream formed from the combustion product gas mixture 660. Water 676 which has been preheated and deaerated in deaerator 410, is fed into a into a steam drum 640. The steam drum is typically elevated. Water 677 from the steam drum 640 is directed to heat exchanger 680 which provides indirect heat exchange between the water and the reformed gas mixture 612. Water from steam drum 640 is also directed to convection section 620 for indirect heat exchange between the water and the combustion product gas mixture 660. A two-phase mixture of steam and water flows from heat exchanger 680 and convection section 620 back to the steam drum 640. A saturated stream of steam 655 is withdrawn from the steam drum 640 while liquid water is recirculated to the heat exchangers to form more steam. The saturated stream of steam 655 is superheated in the convection section 620. The superheated steam is used to replenish the feed steam stream 603 in this example without forming export steam.

The process shown in the process flow diagram in FIG. 6 was modeled using commercial process simulator software.

The steam-to-carbon ratio, S/C, which is an input parameter, and results for this configuration are summarized in Table 1. The results include the ratio of steam used for reforming to the total steam produced, $S/S_T$, and the net and gross specific energy.

As shown in Table 1, according to the simulation results, all of the steam produced in the system is recycled back to the reformer in the mixed feed. No steam is exported in this configuration.

The normalized net specific energy is decreased about 1.8% compared to the net specific energy of Example 1. The specific energy consumption is less than the specific energy consumption in Example 1 even when credit is given for export steam.

Since the process according to Example 5 produces no export steam, the gross specific energy and the net specific energy are the same. The results show that the gross specific energy for the method in Example 5 is lower than the gross specific energy of Examples 1-3. This is important for cases where there is little or no need for export steam.

Although the present invention has been described as to specific embodiments or examples, it is not limited thereto, but may be changed or modified into any of various other forms without departing from the scope of the invention as defined in the accompanying claims.

TABLE 1

|  | Example 1 | Example 2 | Example 3 | Example 4 | Example 5 |
|---|---|---|---|---|---|
| S/C | 3 | 3 | 2.5 | 3 | 2.5 |
| $S/S_T$ | 0.53 | 0.67 | 0.64 | 1 | 1 |
| Net Specific Energy | 100 | 99.7 | 98.5 | 102.3 | 98.2 |
| Gross Specific Energy | 116.1 | 107 | 108.1 | 102.3 | 98.2 |

We claim:

1. A method for generating hydrogen and/or synthesis gas in a production facility comprising:

withdrawing a reformed gas mixture comprising $H_2$, CO, $CO_2$ and $H_2O$ from a plurality of catalyst-containing reformer tubes of a reformer;

forming a $H_2$ product gas stream, a $CO_2$ by-product stream, and a residual gas stream from the reformed gas mixture, wherein the residual gas stream has a mass flow rate, $W_T$, and contains less than 10 mole % $CO_2$ and less than 65 mole % $H_2$;

optionally introducing a first portion of the residual gas stream into a shift reactor, wherein the first portion of the residual gas stream has a mass flow rate, $W_1$;

forming a reformer feed gas mixture stream from a feed steam stream, a second portion of the residual gas stream, and a reformer feedstock stream comprising a hydrocarbon, wherein the feed steam stream has a first steam mass flow rate, $R_1$ and wherein the second portion of the residual gas stream has a mass flow rate, $W_2$;

introducing the reformer feed gas mixture stream into the plurality of catalyst-containing reformer tubes and reacting the hydrocarbon with the steam in a reforming reaction under reaction conditions effective to form the reformed gas mixture;

introducing a fuel stream comprising combustible gases into a combustion section of the reformer, the fuel stream comprising a third portion of the residual gas stream and optionally a supplemental fuel stream, the third portion of the residual gas stream having a mass flow rate, $W_3$;

introducing an oxidant stream containing oxygen into the combustion section of the reformer;

combusting the combustible gases with the oxygen in the combustion section under conditions effective to combust the combustible gases to form a combustion product gas mixture and generate heat to supply energy for the reforming reaction;

withdrawing the combustion product gas mixture from the combustion section of the reformer; and generating an intermediate gas stream comprising steam from a liquid water-containing stream via indirect heat exchange between the liquid water-containing stream and at least one of a stream formed from the reformed gas mixture and a stream formed from the combustion product gas mixture, the intermediate gas stream comprising steam having a pressure of 2 MPa to 12 MPa and having a second steam mass flow rate, $R_2$, wherein $$0.9 \leq \frac{R_2}{R_1} \leq 1.2;$$

and wherein $$0 < \frac{W_1 + W_2}{W_T} < 0.35.$$

2. The method of claim 1 wherein $$0.9 \leq \frac{R_2}{R_1} \leq 1.1.$$

3. The method of claim 1 wherein $$\frac{W_1 + W_2}{W_T} < 0.2.$$

4. The method of claim 1 wherein $$0 \leq \frac{W_1}{W_T} \leq 0.1.$$

5. The method of claim 1 wherein $$0.8 \leq \frac{W_1 + W_2 + W_3}{W_T} \leq 1.$$

6. The method of claim 1 wherein the $CO_2$ by-product stream contains 80 to 100 mole % $CO_2$ on a dry basis.

7. The method of claim 1 wherein the fuel stream has a hydrogen concentration of 0 to less than 50 mole % $H_2$.

8. The method of claim 1 further comprising:
replenishing the feed steam stream from a stream formed from at least a portion of the intermediate gas stream comprising steam.

9. The method of claim 1 further comprising:
superheating at least a portion of the intermediate gas stream via indirect heat exchange between the intermediate gas stream and at least a portion of the stream formed from the reformed gas mixture or another stream formed from the reformed gas mixture thereby forming a superheated intermediate gas stream; and replenishing the feed steam stream from a stream formed from at least a portion of the superheated intermediate gas stream.

10. The method of claim 9 wherein the superheated intermediate gas stream is superheated by 40° C. to 175° C.

11. The method of claim 1 further comprising:

superheating at least a portion of the intermediate gas stream via indirect heat exchange between the intermediate gas stream and at least a portion of the stream formed from the combustion product gas mixture or another stream formed from the combustion product gas mixture thereby forming a superheated intermediate gas stream; and replenishing the feed steam stream from at least a portion of the superheated intermediate gas stream.

12. The method of claim 11 wherein the superheated intermediate gas stream is superheated by 40° C. to 175° C.

13. The method of claim 1 wherein the intermediate gas stream comprising steam has a pressure of 2 MPa to 5 MPa.

14. The method of claim 1 further comprising:

introducing at least a portion of the stream formed from the reformed gas mixture with a temperature of 185° C. to 230° C. into a shift reactor containing copper oxide-based catalyst.

15. The method of claim 1 further comprising:

superheating the intermediate gas stream via indirect heat exchange between the intermediate gas stream and at least a portion of the stream formed from the reformed gas mixture or another stream formed from the reformed gas mixture thereby forming a superheated intermediate gas stream;

passing at least a portion of the superheated intermediate gas stream through a steam turbine to generate power and thereby forming a steam turbine effluent from the superheated intermediate gas stream; and replenishing the feed steam stream from at least a portion of the steam turbine effluent.

16. The method of claim 1 wherein the step of forming the $CO_2$ by-product stream, the $H_2$ product gas stream, and the residual gas stream comprises:

passing at least a portion of the reformed gas mixture to a $CO_2$ extractor to form the $CO_2$ by-product stream and a $CO_2$-depleted reformed gas mixture; and passing at least a portion of the $CO_2$-depleted reformed gas mixture to a pressure swing adsorber to form the $H_2$ product gas stream and the residual gas stream.

17. The method of claim 1 wherein the step of forming the reformer feed gas mixture stream comprises:

mixing the second portion of the residual gas stream and the reformer feedstock stream to form a hydrodesulphurization unit feed gas mixture stream;

passing the hydrodesulphurization unit feed gas mixture stream to a hydrodesulphurization unit to form a sulfur-depleted reformer feedstock stream from an effluent of the hydrodesulphurization unit;

mixing the feed steam stream and the sulfur-depleted reformer feedstock stream to form a prereformer feed gas mixture stream; and passing the prereformer feed gas mixture stream into a prereformer to form the reformer feed gas mixture stream from an effluent of the prereformer.

18. The method of claim 1 wherein the step of forming the reformer feed gas mixture stream comprises:

passing the reformer feedstock stream to a hydrodesulphurization unit to form a sulfur-depleted reformer feedstock stream from an effluent of the hydrodesulphurization unit;

mixing the second portion of the residual gas stream, the feed steam stream and the sulfur-depleted reformer feedstock stream to form a prereformer feed gas mixture stream; and passing the prereformer feed gas mixture stream into a prereformer to form the reformer feed gas mixture stream from an effluent of the prereformer.

19. The method of claim 1 wherein the step of forming the reformer feed gas mixture stream comprises:

passing the reformer feedstock stream to a hydrodesulphurization unit to form a sulfur-depleted reformer feedstock stream from an effluent of the hydrodesulphurization unit;

mixing the feed steam stream and the sulfur-depleted reformer feedstock stream to form a prereformer feed gas mixture stream;

passing the prereformer feed gas mixture stream into a prereformer to form a prereformer effluent stream; and mixing the prereformer effluent stream and the second portion of the residual gas stream to form the reformer feed gas mixture stream.

20. The method of claim 1 wherein 90% to 100% of the energy for the reforming reaction is provided by combustion of the third portion of the residual gas stream.

* * * * *